(No Model.)
A. HAGSTRÖM.
HYGROSCOPE.
No. 447,726. Patented Mar. 3, 1891.
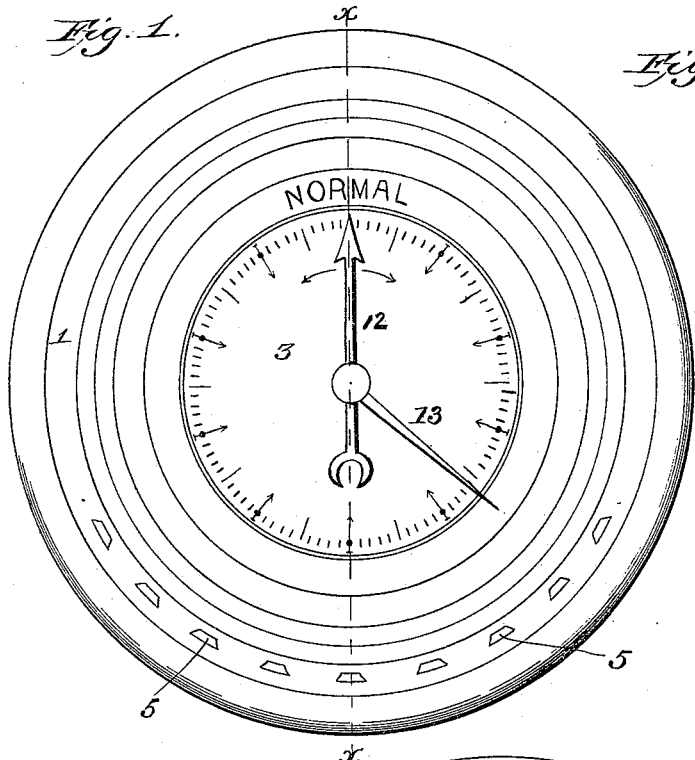
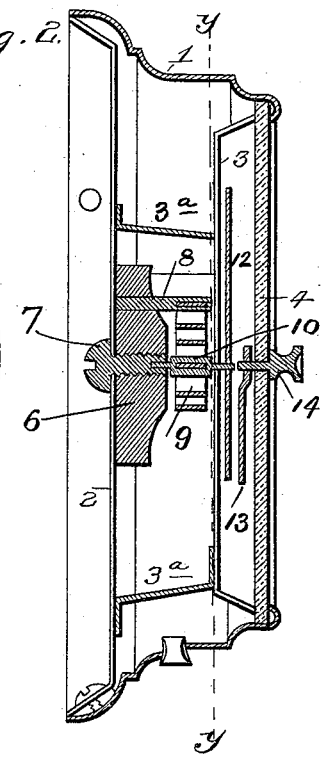
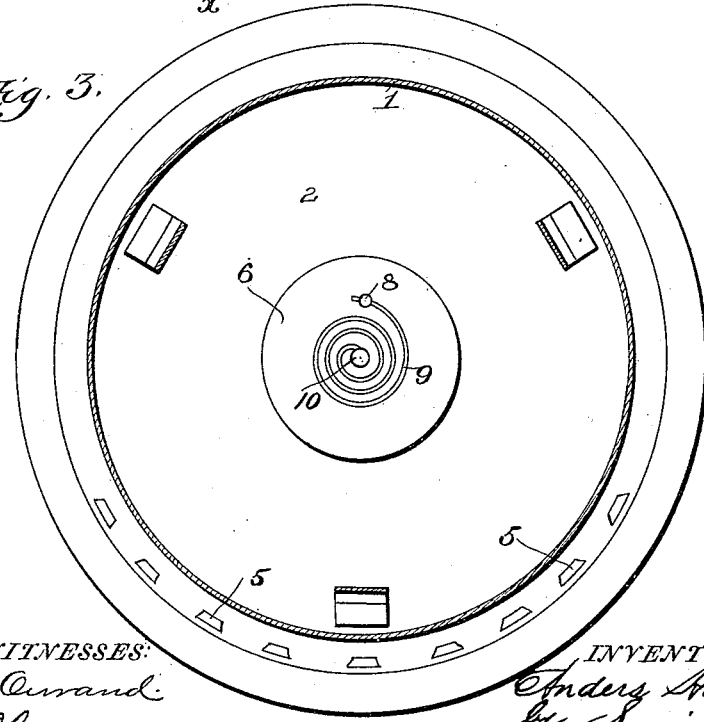
WITNESSES:
F. L. Ourand
J. L. Coombs
INVENTOR:
Anders Hagström,
By Saurs Paggert
Attorneys.

UNITED STATES PATENT OFFICE.

ANDERS HAGSTRÖM, OF ESLÖF, ASSIGNOR OF ONE-HALF TO CARL FROST, OF MALMÖ, SWEDEN.

HYGROSCOPE.

SPECIFICATION forming part of Letters Patent No. 447,726, dated March 3, 1891.

Application filed September 27, 1890. Serial No. 366,351. (No model.) Patented in Sweden July 24, 1890, No. 2,473.

*To all whom it may concern:*

Be it known that I, ANDERS HAGSTRÖM, a subject of the King of Sweden, and a resident of Eslöf, in the Kingdom of Sweden, have invented certain new and useful Improvements in Hygrometers, (for which I have obtained Letters Patent in Sweden under date of July 24, 1890, No. 2,473;) and I do hereby declare that the following is a full, clear, and exact description of the invention, which will enable others skilled in the art to which it appertains to make and use the same, reference being had to the accompanying drawings, which form a part of this specification.

My invention relates to improvements in hygrometers or instruments for indicating the humidity of the atmosphere.

The invention refers more particularly to that class of hygrometers in which a graduated dial is employed in connection with a pointer and an arbor connected with a volute, the contraction and expansion of which, due to variations in the humidity of the atmosphere cause said pin and shaft to be actuated and the amount of moisture to be indicated on the dial by the pointer. These instruments are very objectionable in practice, owing to the difficulty in regulating the tension of the spiral, so that it will properly perform its work and the pointer accurately indicate the degree of moisture.

To these ends the invention consists in the novel construction and combination of parts hereinafter fully described, and specifically pointed out in the claims.

It also consists in the novel construction of volute by the contraction and expansion of which the pointer is actuated, as will be hereinafter described and claimed.

In the accompanying drawings, Figure 1 is a front view of a hygrometer constructed in accordance with my invention. Fig. 2 is a cross-section on the line $x\,x$, Fig. 1. Fig. 3 is a section on the line $y\,y$, Fig. 2.

In the said drawings the reference-numeral 1 designates a casing made of metal or other suitable material provided with a back 2, a graduated dial 3, and a glass plate 4 covering said dial. This casing may be of any ordinary or suitable construction and is provided with a number of apertures 5 for the admission of the atmosphere to the interior thereof. The dial 3 is supported by means of arms $3^a$ secured thereto and to the back 2 of the casing.

Located within the casing is a wooden disk 6, which is carried by a screw 7, passing through the back 2. This screw is capable of being rotated so that by turning the same the disk 6 can also be rotated.

The numeral 8 designates a forwardly-projecting pin secured to the disk 6 and having a slot near its free end which receives the outer end of a volute 9, the inner end of which is connected with the arbor 10, journaled in a recess in the inner end of the screw 7 and passing through the dial 3, where its projecting end is provided with a pointer 12. The volute 9 is made from a strip of paper, preferably what is known as "Whatman's drawing-paper," prepared as follows: I first take a strip of the paper of proper length and width and coat one side of the same with soluble albumen. When the albumen is nearly dry, I coat the same with a suitable gum—such as gum-arabic or gum-tragacanth. I then apply a piece of thin tissue-paper to said gummed side and then wind the strip so prepared upon a mandrel. When dry a volute spring will be formed which is very sensitive to moisture. The object of the albumen and gum coatings is to impart the requisite stiffness to the volute, while the object of the tissue-paper is to prevent the convolutions from adhering to each other when the strip is wound upon the mandrel. When the ends of the volute are secured respectively to the pin 8 and arbor 10, the latter will be oscillated by the contraction and expansion of the volute.

The numeral 13 designates a hand journaled in the glass plate 4 and having an operating-head 14. This hand is manually actuated, and is designed to indicate the greatest variation in humidity from normal of the preceding day.

The operation of the device will be readily understood. The parts being properly adjusted, the tension of the volute is regulated by means of the disk 6 and screw 7. If for any reason the volute should not accurately indicate the degree of humidity, which can be ascertained by comparing it with a standard instrument, the defect may be remedied by said disk and screw, as will be obvious, without taking the instrument apart.

Variations in the degree of moisture contained in the atmosphere will contract or expand the volute, actuating the pointer in the usual manner.

Having thus described my invention, what I claim is—

1. In a hygrometer, the combination, with the casing, the graduated dial, and an arbor carrying a pointer, of a rotatable disk located within the casing and connected therewith by means of a rotatable screw, a projecting pin secured to said disk and the volute connected with said pin and arbor, substantially as described.

2. A volute for hygrometers, consisting of a strip of thick paper coated with albumen and then covered with a suitable gum and with tissue-paper, substantially as described.

In testimony that I claim the foregoing as my own I have hereunto affixed my signature in presence of two witnesses.

ANDERS HAGSTRÖM.

Witnesses:
C. H. GREER,
GUST. L. LARSSON.